United States Patent [19]
Ettridge

[11] Patent Number: 5,379,684
[45] Date of Patent: Jan. 10, 1995

[54] DEEP FRYER

[75] Inventor: Ian G. Ettridge, Stourton, England

[73] Assignee: Moulinex Swan Holding Limited, Birmingham, England

[21] Appl. No.: 117,488

[22] Filed: Sep. 7, 1993

Related U.S. Application Data

[63] Continuation of Ser. No. 24,100, Feb. 26, 1993, abandoned, which is a continuation of Ser. No. 783,847, Oct. 29, 1991, abandoned.

[51] Int. Cl.⁶ ............................................. A41J 37/12
[52] U.S. Cl. ...................................... 99/336; 99/407; 99/410; 99/413
[58] Field of Search ............... 99/336, 407, 327, 330, 99/331, 413, 410, 411, 328; 426/117

[56] References Cited

U.S. PATENT DOCUMENTS

| | | | |
|---|---|---|---|
| 3,217,633 | 11/1965 | Anetsberger | 99/327 |
| 4,508,026 | 4/1985 | Anetsberger | 99/407 |
| 4,593,170 | 6/1986 | Maeda et al. | 99/336 |
| 4,732,081 | 3/1988 | Sakuma | 99/407 |
| 4,785,725 | 11/1988 | Tate et al. | 99/336 |
| 4,852,471 | 8/1989 | Lansing | 99/336 |
| 4,898,091 | 2/1990 | Rozak et al. | 99/336 |
| 4,951,558 | 8/1990 | Figliuzzi | 99/336 |

Primary Examiner—David A. Scherbel
Assistant Examiner—Reginald L. Alexander
Attorney, Agent, or Firm—Renner, Kenner, Greive, Bobak, Taylor & Weber

[57] ABSTRACT

A deep fryer has a vessel in which cooking medium such as fat or oil is contained and a heater to heat the medium to a cooking temperature. A basket is provided for carrying the food to be cooked. The basket is carried on a transport means which raises it out of the cooking medium and lowers it back in again at least one time during the cooking cycle. An embodiment is disclosed in which the basket is detachably mounted on a vertical slide on the wall of the vessel. The slide is driven via transmission means by a stepper motor. A microprocessor-based controller determines the number and the timing of the raising and lowering operation.

7 Claims, 3 Drawing Sheets

DEEP FRYER

This is a continuation of application Ser. No. 024,100, filed Feb. 26, 1993, which was a continuation of application Ser. No. 783,847, filed Oct. 29, 1991 all now abandoned.

BACKGROUND OF THE INVENTION

1. Field of the Invention

This invention relates to a deep fryer of the kind comprising a vessel in which a liquid cooking medium, typically oil or melted fat, is heated, and a basket in which foodstuff to be fried is supported and is lowered into the vessel to immerse the foodstuff in the cooking medium.

2. Summary of the Prior Art

Deep fryers of the kind set forth are known in which the vessels include electric heating means for heating the cooking medium in the vessel. It is also known for the baskets to have handles by which they are manually lowered into and raised out of the vessels, and for the baskets to be lowered and raised in the vessel by power driven means. An example of a known type of deep frier with such power driven means is disclosed in U.S. Pat. No. 4,437,159.

SUMMARY OF THE INVENTION

When foodstuff is introduced into the cooking medium the temperature of the medium drops. The greater the quantity of foodstuff that is introduced the greater is the drop in the temperature of the medium. It is usual for the cooking medium to be heated to the required frying temperature, typically 180°–200° C., before the foodstuff is introduced. It can take an appreciable time for the temperature to recover to the required level. Indeed in some instances where the fryers have automatically timed cooking cycles with no manual override and the foodstuff has been introduced into the medium in a frozen state it has not been possible for the cooking medium to return to the required frying temperature in the allotted time in the cooking cycle. In consequence the foodstuff has not been sealed, or not properly so, and has tended to absorb a relatively high volume of the cooking medium. Poor cooking results in these circumstance which is undesirable and may give rise to health risks.

According to the present invention a deep fryer of the kind set forth is provided having transport means operative to cause the basket to be automatically raised from and lowered into the cooking medium during a cooking cycle.

By raising and lowering the basket in the course of a cooking cycle recovery of the cooking medium to the required cooking temperature has been found to be facilitated and accelerated. Sealing of the foodstuffs held in the basket for frying is assisted in consequence of the improved recovery.

Preferably the transport means operates to raise the basket to lift the foodstuff it holds out of the cooking medium soon after the initial lowering of the basket and immersion of the foodstuff. This short initial immersion partially seals the foodstuff and the cooking medium can quickly recover to the required cooking temperature while the basket is raised, enabling the sealing to be completed when the basket is lowered again to re-immerse the foodstuff.

The transport means may leave the basket lowered after the initial raising until the end of the cooking cycle, or it may cause the basket to be raised and lowered one or more further times after initial raising and subsequent lowering before the cooking cycle is completed. The number of times that the basket is caused to be lowered and raised in a cooking cycle may be variable to suit the type and/or amount of food to be fried.

The deep fryer may have provision for varying temperatures and/or times to give a number of possible cooking cycles which can be selected to suit a variety, and differing amounts, of foodstuffs. Where there is such provision the transport means for automatically lowering and raising the basket is preferably associated with it so as to be controlled for lowering and raising the basket according to temperatures and/or times selected.

At the end of the or any selected cooking cycle the transport means preferably causes the basket to be raised to lift the foodstuff out of the cooking medium.

An electric motor may drive the basket through transmission means of various kinds, for example a gear train, rack and pinion or worm, or a chain or belt drive system. Automatic control of the motor is conveniently provided electronically or electro-mechanically by a control unit. An electronic memory may be included in the control unit providing for a range of cooking cycles of varying times and temperatures according to types of foodstuff and quantities and/or weights which the user can select as required, and which automatically programs the raising and lowering of the basket to suit any selected cooking cycle. The motor is preferably a stepper motor which has the advantage of being easy to control accurately using an electronic controller.

A control may be provided operable by the user to raise the basket from the cooking medium during the cooking cycle. This allows the user to inspect the progress of the cooking of the food in case there is any doubt about the suitability of the cycle selected by the control unit. Once the food has been inspected the control may be activated to resume the cooking cycle.

The progress of the cooking cycle may be entirely predetermined by the control unit before the start of the cycle. The cycle will therefore be of fixed length and the raising and lowering operations will take place at predetermined intervals dependent upon the initial selection made by the user.

Alternatively, the temperature of the cooking medium may be continuously monitored during the cooking cycle and the duration of the cycle and the timing and the number of raising and lowering cycles can be adjusted by the control unit if the temperature of the cooking medium varies from its expected value. This method of control is more adaptable to variations in the initial condition of the food and gives more reliable results.

Electrically controlled means are known in deep fryers for lowering the basket to immerse foodstuff at the beginning of a cooking cycle and to raise the basket automatically at the end of the cooking cycle. A deep fryer in accordance with the present invention may have such means modified to raise and lower the basket one or more times intermediate the lowering at the beginning and the raising at the end of the cooking cycle.

The deep fryer may be adapted for fan-assisted hot air cooking of foodstuff to be operative while the basket is raised in the course of a cooking cycle, after the initial lowering of the basket and immersion of the foodstuff in the cooking medium. Cooking of the foodstuff may therefore be continued when the foodstuff has been lifted out of of the cooking medium, hastening the cooking cycle. The fan-assisted cooking may be brought into operation automatically as the basket is raised, and discontinued as the basket is subsequently lowered. A fan and air heater must be specially provided if hot air cooking is to be implemented. Such a fan reverses the normal flow of air through the machine so that air is drawn in to be heated by the air heater when the food is raised.

An embodiment of the invention will now be described by way of example with reference to the accompanying drawings.

DESCRIPTION OF A PREFERRED EMBODIMENT

Figure 1:
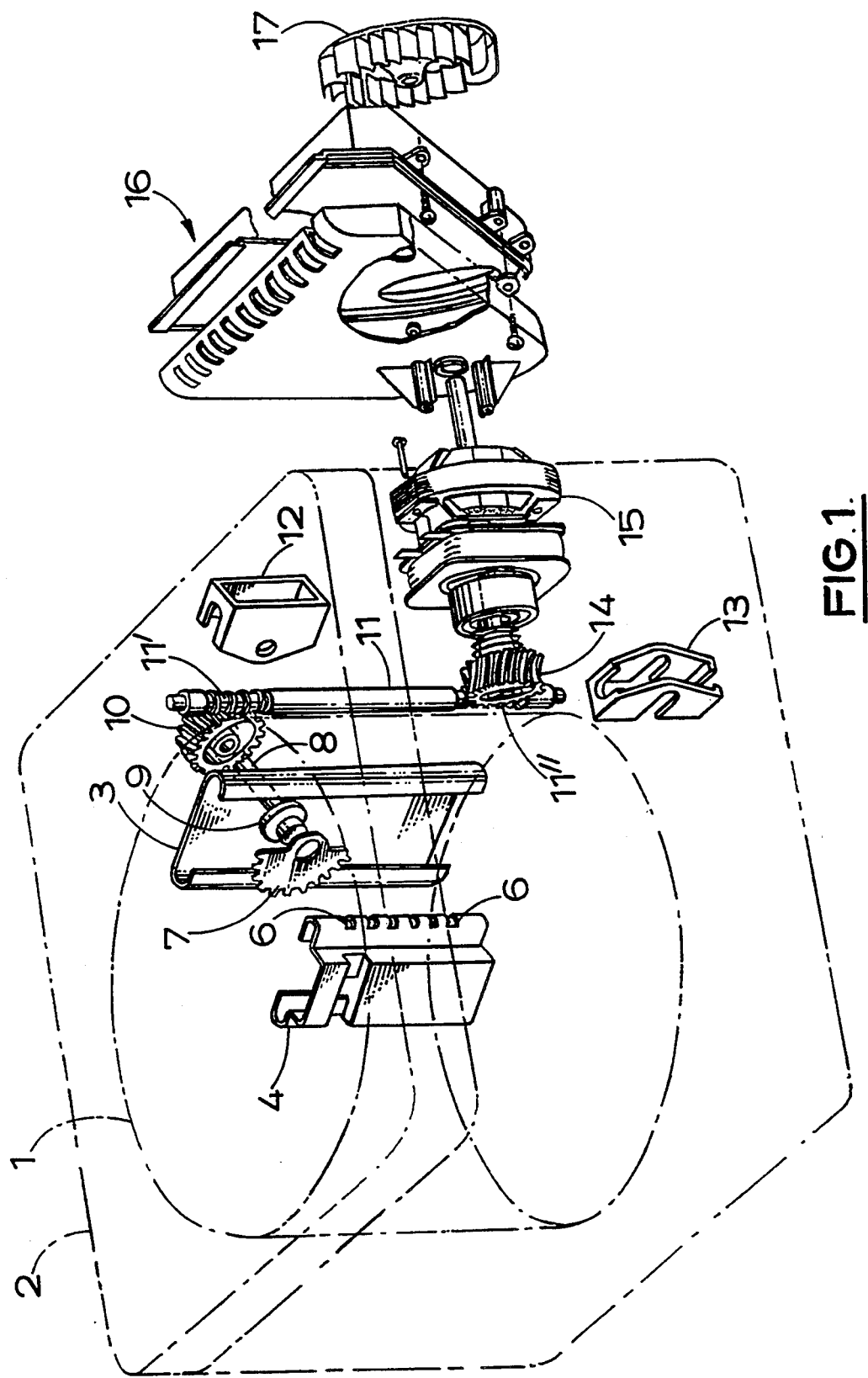
FIG. 1 is an exploded diagram of transport means of a deep fryer embodying the invention.

Referring first to FIG. 1, a deep fryer comprises a housing 2 in which is contained a vessel 1 in the form of a deep pan. The vessel 1 contains the frying medium, typically oil or fat, which is heated by an electric heating element (not shown) contained within the vessel 1. A vertical guideway 3, being C-shaped in plan, is mounted on the inner wall of the vessel 1 with its open side facing into the vessel 1.

Figure 3:
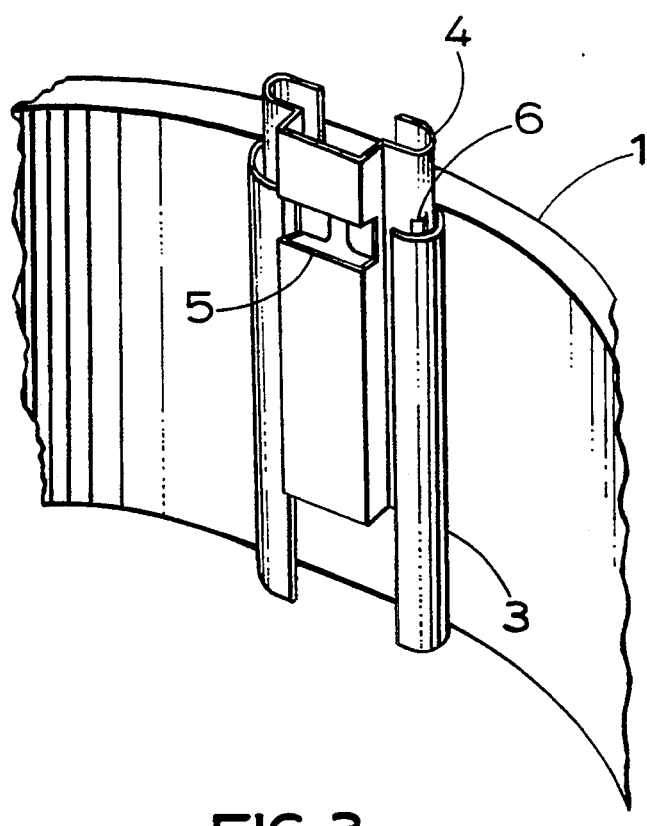
FIG. 3 shows the operating arrangement of slide components of the transport means.

A slide 4 is located within the guideway 3 as shown in FIG. 3. The slide 4 has two U-shaped sides connected by a web. The sides are shaped and dimensioned to fit within the sides of the guideway 3 such that the slide 4 may move vertically within the guideway 3 and is retained therein. The web is top-hat shaped in section and projects out of the open side of the guideway 3. Near the top of the web there is a slot 5 which extends across the projecting portion of the web to receive the bracket of the basket, as described below.

A plurality of holes 6 are provided, in a vertical row, through the two extremities of the sides of the web of the slide 4. A sector gear 7 is located within the guideway 3; its teeth engage with the holes 6. The sector gear 7 is mounted on a rotatable shaft 8 such that rotation of the shaft turns the sector gear 7 and causes the slide to move up or down the guideway 3.

The shaft 8 passes through the wall of the vessel 1 through a bush 9. A first gear wheel 10 is mounted close to the outer end of the shaft 8. A vertical shaft 11 has helical grooves 11', 11" cut into its surface close to both of its ends. The teeth of the first gear wheel 10 engage in the groove 11' at the upper end, thus rotation of the vertical shaft 11 rotates the first gear wheel 10. Bearings 12, 13 constrain the vertical shaft 22 to rotational movement only.

A second gear wheel 14 is provided in engagement with the lower helical groove 11" in the vertical shaft 11. The second gear wheel 14 is carried on the output shaft of a stepper motor 15. The complete arrangement allows rotational motion of the stepper motor 15 to be converted through the second gear wheel 14, the vertical shaft 11, the first gear wheel 10, the shaft 8 and the sector gear 7 to vertical motion of the slide 6. The stepper motor 15 is mounted on an enclosure 16 mounted on the housing 2 and also drives a cooling fan 17.

Figure 2:
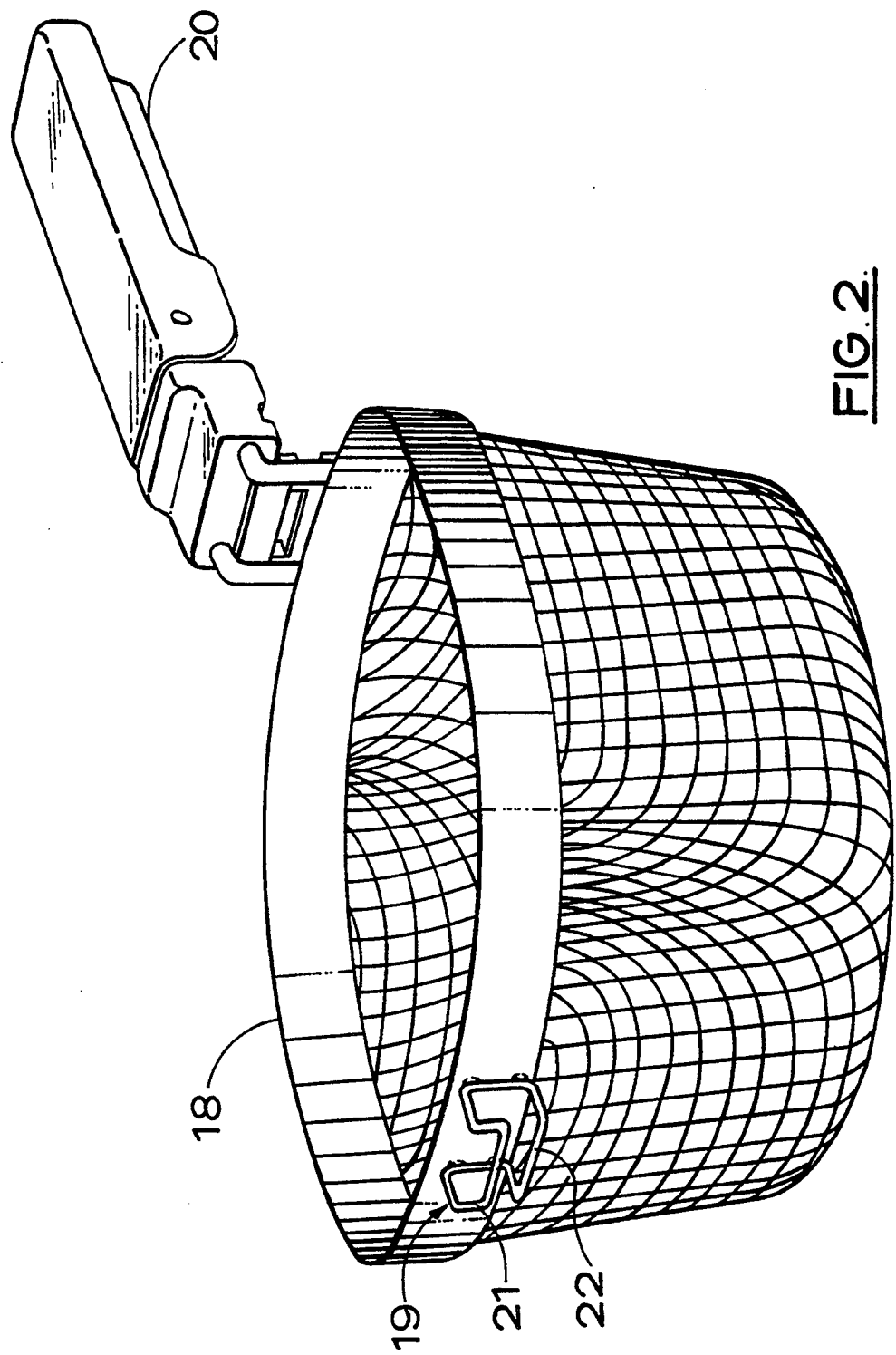
FIG. 2 shows a basket for use with a fryer embodying the invention.

The basket 18, as shown in FIG. 2, is provided with a bracket 19 diametrically opposite its handle 20. The bracket 19, which is formed from a bent piece of stiff wire, has a hook portion 21 shaped and dimensioned operatively to enter the slot 5 in the slide 4, and an abutment portion 22 arranged to operatively abut the slide 4 below the slot 5. The bracket 19 can support the basket 18 from the slide 4 in an orientation suitable for use.

A control unit (not shown) is provided which can, under control of the operator, rotate the stepper motor 15 to move the slide 4 between its upper and lower operating positions. The control unit, which is, conveniently, a microcomputer or microcontroller, also causes the basket 18 to be raised and lowered during the cooking cycle.

Controls are provided on the housing for selecting and setting the temperatures and times of cooking cycles and the operation of the electric motor to lower and raise the basket during the course of a selected cooking cycle. The number of times that the basket 18 is raised and lowered in the course of the cooking cycle depends upon the cycle selected. In some cycles the basket may be raised and lowered again only once after the initial lowering of the basket to aid the sealing of the foodstuff being fried, whereas in other cycles the basket may be raised and lowered several times before the cycles are completed.

In use, the operator first puts the food to be cooked into the basket which will, initially, be in its raised position. The operator then uses the control unit to set the appropriate cooking cycle for the food. This will preferably be selected by the operator setting controls on the control unit which relate to the food itself such as the weight of the food, the type of food (vegetables, meat, fish etc), whether or not the food is frozen etc. The control unit is programmed to calculate the optimum cooking cycle for the food to be cooked.

Once the controls have been set the operator then starts the cooking cycle. The first stage in the cycle is for the cooking medium to be heated to the cooking temperature. Once the correct temperature has been attained the basket is lowered into the cooking medium. At the optimum time or times, as determined by the control unit, the basket is automatically raised from and lowered into the cooking medium. At the end of the cooking cycle the basket is raised from the cooking medium and the heater for the cooking medium is switched off.

What is claimed is:

1. A deep fryer, comprising:

a vessel in which a cooking medium is heated;

a basket in which foodstuff to be fried is supported and lowered into the vessel to immerse the foodstuff in the cooking medium;

transport means operative to cause the basket to be automatically raised and subsequently lowered in the vessel during a cooking cycle;

control means for controlling the number of and timing of the automatic raising and subsequent lowering operations performed by the transport means, including monitoring means for monitoring the temperature of the cooking medium throughout the cooking cycle, the control means being operative to automatically vary at least one of the timing and the number of raising and subsequent lowering operations performed during the cooking cycle in the event that the temperature of the cooking medium as monitored by the monitoring means, varies from a predetermined cooking temperature.

2. A deep fryer according to claim 1 in which the transport means is operative to cause the basket to be lowered into the cooking medium at the start of the cooking cycle and raised from it at the end of the cooking cycle.

3. A deep fryer according to claim 1 in which the control means is adjustable by the operator to vary at least one of the number of times that the basket is automatically raised and lowered during a cooking cycle and the time or times within the cycle at which the basket is automatically raised and lowered.

4. A deep fryer according to claim 3 in which the control means is a microcomputer.

5. A deep fryer according to claim 1 in which the transport means comprises an electric motor connected by transmission means to a slide mounted for vertical movement within the vessel, the basket, in use, being connected to the slide.

6. A deep fryer according to claim 1 having means for passing hot air over the food when the basket is raised during a cooking cycle.

7. A deep frier according to claim 1 having a control operable by the user during the cooking cycle to raise the basket from the cooking medium to allow inspection of the food and further operable to lower the basket and resume the cooking cycle.

* * * * *